(12) United States Patent
Ulmert

(10) Patent No.: US 11,708,282 B2
(45) Date of Patent: Jul. 25, 2023

(54) METHOD OF OPTIMIZING THE CHEMICAL PRECIPITATION PROCESS IN WATER TREATMENT PLANTS AND WASTE WATER TREATMENT PLANTS

(71) Applicant: David Ulmert, Lund (SE)

(72) Inventor: David Ulmert, Lund (SE)

( * ) Notice: Subject to any disclaimer, the term of this patent is extended or adjusted under 35 U.S.C. 154(b) by 0 days.

(21) Appl. No.: 16/968,506

(22) PCT Filed: Feb. 12, 2019

(86) PCT No.: PCT/SE2019/050118
§ 371 (c)(1),
(2) Date: Aug. 7, 2020

(87) PCT Pub. No.: WO2019/156621
PCT Pub. Date: Aug. 15, 2019

(65) Prior Publication Data
US 2020/0407250 A1 Dec. 31, 2020

(30) Foreign Application Priority Data

Feb. 12, 2018 (SE) .................................. 1800035-6

(51) Int. Cl.
*C02F 1/52* (2023.01)
*C02F 1/56* (2023.01)
*C02F 1/66* (2023.01)

(52) U.S. Cl.
CPC .......... *C02F 1/5209* (2013.01); *C02F 1/5245* (2013.01); *C02F 1/56* (2013.01);
(Continued)

(58) Field of Classification Search
CPC .................................................. C02F 1/5209
See application file for complete search history.

(56) References Cited

U.S. PATENT DOCUMENTS

| 2005/0230299 A1* | 10/2005 | Saho ...................... C02F 1/488 210/223 |
| 2007/0074758 A1* | 4/2007 | McQuade ............... C02F 1/008 137/2 |

(Continued)

FOREIGN PATENT DOCUMENTS

| CN | 107324466 A | 11/2017 |
| KR | 20080098867 A * | 11/2008 ................ C02F 1/52 |

(Continued)

OTHER PUBLICATIONS

Kimura et al., "Minimizing residual aluminum concentration in treated water by tailoring properties of polyaluminum coagulants", Water Research, 2013, 47: 2075-2084.

*Primary Examiner* — Peter Keyworth
(74) *Attorney, Agent, or Firm* — James S. Keddie; Bozicevic, Field & Francis LLP

(57) ABSTRACT

The invention pertains to a method of optimizing the chemical precipitations process in water treatment plants and waste water treatment plants using an aluminum based coagulant, wherein the optimization, which comprises the degree of contamination of the Clear water phase after precipitation and sludge separation, cost of operation and sludge production, is obtained by in situ regulation, of precipitation pH, amount of coagulant that is used in the precipitation process and the basicity of the coagulant, based at least on online measurement of degree of contamination, pH, flow and temperature of incoming untreated water and/or in the clear water phase, characterized in that the basicity of the coagulant is regulated by adding in situ, to a stock solution of polymerized aluminum based coagulant (A), acid or a solution of an aluminum based coagulant (B) having a lower basicity than the polymerized aluminum based coagulant (A) in the stock solution.

11 Claims, 1 Drawing Sheet

(52) U.S. Cl.
CPC .......... *C02F 1/66* (2013.01); *C02F 2209/001* (2013.01); *C02F 2209/003* (2013.01); *C02F 2209/02* (2013.01); *C02F 2209/06* (2013.01); *C02F 2209/07* (2013.01); *C02F 2209/18* (2013.01); *C02F 2209/40* (2013.01)

(56) References Cited

U.S. PATENT DOCUMENTS

| | | | |
|---|---|---|---|
| 2013/0168325 A1 | 7/2013 | Song et al. | |
| 2013/0299426 A1 | 11/2013 | McLeod | |
| 2016/0009576 A1* | 1/2016 | Ulmert | C02F 1/5245 210/709 |

FOREIGN PATENT DOCUMENTS

| | | |
|---|---|---|
| KR | 20080098867 A | 11/2008 |
| KR | 101159236 B1 | 6/2012 |
| WO | WO 2014/133448 A1 | 9/2014 |

* cited by examiner

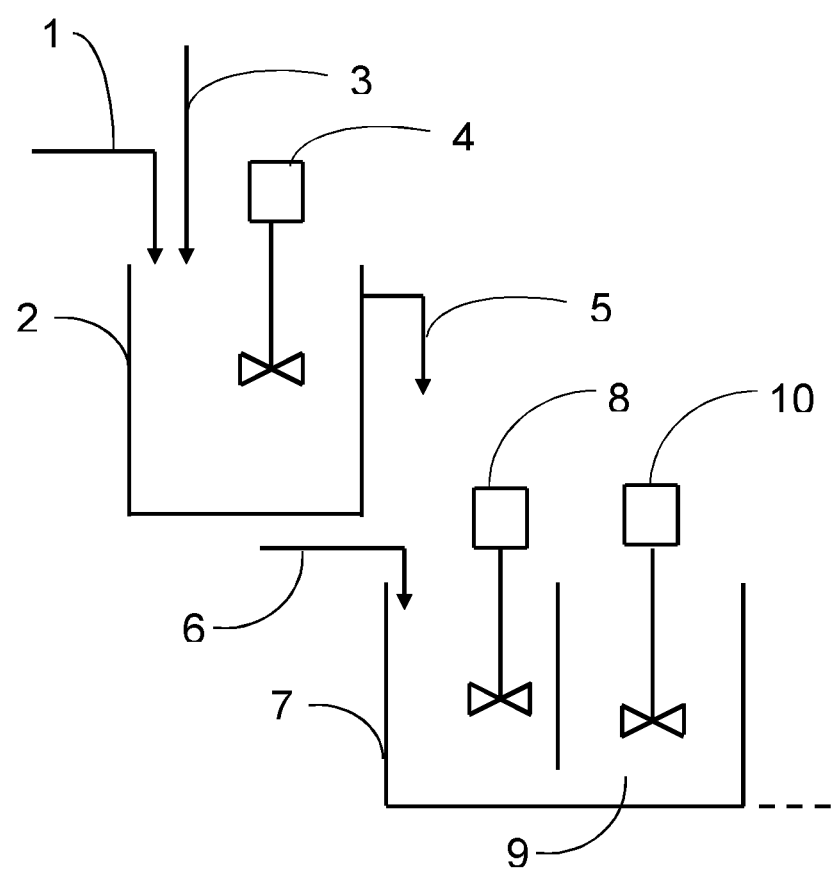

METHOD OF OPTIMIZING THE CHEMICAL PRECIPITATION PROCESS IN WATER TREATMENT PLANTS AND WASTE WATER TREATMENT PLANTS

CROSS-REFERENCE TO RELATED APPLICATIONS

This application is a § 371 national phase of International Application No. PCT/SE2019/050118, filed on Feb. 12, 2019, which claims the benefit of Swedish Patent Application No. 1800035-6, filed on Feb. 12, 2018, which applications are incorporated by reference herein.

TECHNICAL FIELD

The present invention concerns a method of in situ optimizing both coagulant dosing (amount) and basicity during chemical precipitation using aluminum based coagulants in water treatment plants and waste water treatment plants according to the preamble of the independent claim.

BACKGROUND OF THE INVENTION

Aluminum salts (coagulants), such as aluminum sulfate and aluminum chloride, are used to purify raw water as well as waste water by chemical precipitation. The trivalent aluminum ion of the salt is hydrolyzed in the water and forms a poorly soluble aluminum hydroxide precipitate according to:

$$Al^{3+} + OH^- = Al(OH)^{2+}$$

$$Al(OH)^{2+} + OH^- = Al(OH)_2^+$$

$$Al(OH)_2^+ + OH^- = Al(OH)_{3(S)}$$

As the reaction requires the presence of hydroxide ions in the water it may, if applicable, be necessary to add these by for example dosing sodium hydroxide or calcium hydroxide to obtain an optimal precipitation pH of 5.5-6.5. During the hydroxide precipitation flocks are formed in the water, which adsorb and enclose dissolved and nondissolved organic substances and particles in the water. The formed precipitate (the sludge) can be separated from the purified water by for example filtration, sedimentation or floatation. Due to inter alia economic concerns you do not want to add more coagulant than what is necessary to obtain an acceptable quality of the purified water. A not insignificant factor is also that the amount of sludge increases with an increased addition of coagulant, and with it the handling cost and the disposal cost. In certain cases as much as 40% of the formed dry matter amount may consist of precipitated aluminum hydroxide. An optimization of the precipitation process is therefore paramount. During the chemical precipitation the amount of dissolved organic substances in the water is reduced, which often affect the color of the purified water. Accordingly a reduction of for example humus substances in raw water and lignin residues in waste water from pulp mills entails a reduction of the color in the water. The turbidity of the water is also reduced by chemical precipitation. The turbidity is caused by particles in the water which may consist of inorganic substances, such as clays, but also organic compounds, such as remaining bacterial accumulations after biological purification, emulgated oil or fiber. Together they constitute the amount of suspended solids (SS-Suspended Solids) at the same time as the organic part together with dissolved organic substance form the total amount of oxygen consuming substances in the water. The total amount of organic carbon is analyzed as TOC (Total Organic Carbon) and the oxygen consuming substances as COD (Chemical Oxygen Demand).

These analyzes can be performed on-line.

In a water solution of monomeric aluminum solution, complexes with hydroxide bridges can be created. With increasing basicity these complexes get increased charge according to the table below:

|  | OH/Al | Basicity. |
|---|---|---|
| $Al^{3+}$ | 0, 0 | 0% |
| $Al_2(OH)_2^{4+}$ | 1, 0 | 33% |
| $Al_{13}O_4(OH)_{24}^{7+}$ | 2, 5 | 82% |
| $Al(OH)_{3(s)}$ | 3, 0 | 100% |

The complex $Al_2(OH)_2^{4+}$ has a chain form, while the complex $Al_{13}O_4(OH)_{24}^{7+}$ has a spherical form. The latter can be polymerized to chains of spheres of the formula $[Al_{13}O_4(OH)_{24}^{7+}]_n$.

Monomeric aluminum sulfate and aluminum chloride is produced by dissolving an aluminum containing material, for example aluminum hydroxide, in acid, i.e. $H_2SO_4$ and HCl respectively, in stoichiometric amount. An increased basicity can be obtained by using a deficit of acid during the dissolution, which then requires that the reaction takes place at elevated pressure and temperature. An increased basicity can also be obtained by adding hydroxide ions to a monomeric aluminum sulfate or chloride solution. Aluminum sulfate with an elevated basicity is often referred to as PAS (Poly Aluminum Sulfate) and the chloride as PAC (Poly Aluminum Chloride). Monomeric aluminum sulfate is usually provided in granule form with an Al content of about 8% and monomeric aluminum chloride as a solution with the same Al content. Aluminum sulfate can also be obtained in solution but the Al content is then usually about 4%. Polymerized products are most often offered as solutions and then with about 4% Al for PAS and about 8% Al for PAC. The transport cost in relation to the Al-content is therefore lower for PAC than for PAS. If you do not consider yourself in need of a polymerized product, then aluminum sulfate in granule form is most often the most cost effective alternative, especially if consumption is high.

The use of polymerized coagulants (in this case mainly PAC) has increased its market share, mainly depending on that aluminum complexes with an elevated basicity, and therewith increased charge, have been found to be better for reducing turbidity in the water compared with monomeric coagulants. Particles (including colloids) are often negatively charged and a charge neutralization and coagulation is therefore promoted by a high charge of the coagulant. The formation of flocks also happens faster and the hydroxide flocks become larger, which often benefits the flock separation process, especially at low water temperatures. On water with a high turbidity you can therefore often reach a lower turbidity with a poly aluminum coagulant, compared to the same or higher dosing of a monomeric aluminum coagulant. The degree of basicity however has an optimum, because a too high basicity may cause precipitation of aluminum hydroxide before the coagulant has been distributed in the entire water mass that is to be precipitated, i.e. it becomes too reactive. Another drawback with a high basicity is that precipitation of dissolved organic compounds deteriorates.

Therefore, if you have a water whose composition changes over time the basicity of the coagulant may need to be optimized according to the current conditions. One example of this is a raw water from a river which during heavy rains may come to contain a large amount of particles (high turbidity), while at dry periods contain a lower amount of particles (low turbidity) but a higher amount of organic substances. Another example is waste water from a pulp industry. There the content of dissolved organic contaminants in the waste water may be dependent on which forest raw material is used for the moment. In addition to controlling the dosing of coagulant proportionally to the treated water amount it is common that the dosing is also changed based on the turbidity of the outgoing treated water and/or the incoming water. In the same way the color of the water of the content of COD/TOC can be used for controlling the dosing.

Production of PAC and PAS demands a relatively large investment in process equipment, as these processes, if they are based on a deficit of acid, takes place at elevated pressure and temperature. It is also possible to increase the basicity by adding hydroxide ions. These must then be added in solution or as a suspension. The solution or the suspension dilutes the end product, i.e. the Al content decreases and the transport cost increases, an impact which is of no importance if the process takes place in situ. If you, as a producer, have invested in costly process equipment it will also be more profitable to use a lower acid consumption than adding a hydroxide. As the production is centralized the basicity is adapted to the general needs of the users. It would further, due to production technical and logistical reasons, not be possible for a producer to adapt the basicity according the immediate needs of the individual user. This means that the user can only affect the precipitation result by changing the dosing of the coagulant to counter variations in the degree of contamination.

The Swedish patent 536998C2 describes a method of regulating the basicity in situ by adding hydroxide ions to a monomeric aluminum salt. The method is suitable for plants that use aluminum sulfate in granule form and which have already invested in a silo plant for storing the product. Likewise the method is advantageous if cheap lime can be used as hydroxide source, but this also requires access to a silo for storing the lime. The method is therefore suitable for plants that are large consumers of coagulant. For smaller plants there is still a need for further methods.

OBJECT OF THE INVENTION

An object of the invention is therefore to provide a method which by regulation of precipitation pH, coagulant dosing and coagulant basicity leads to an improved degree of purification, lower operation costs and lowered production of sludge, and which is suitable for smaller plants.

SUMMARY OF THE INVENTION

The abovementioned and other objects are achieved by a method according to the independent claim.

The invention accordingly pertains to a method of optimizing the chemical precipitations process in water treatment plants and waste water treatment plants using poly aluminum based coagulants.

The method thus comprises optimizing the chemical precipitation process in water treatment plants and waste water treatment plants using an aluminum based coagulant, wherein the optimization, which comprises the degree of contamination of the clear water phase after precipitation and sludge separation, cost of operation and sludge production, is obtained by in situ regulation, of precipitation pH, amount of coagulant (per $m^3$ of chemically precipitated water) that is used in the precipitation process and the basicity of the coagulant, based at least on online measurement of degree of contamination, pH, flow and temperature of incoming untreated water and/or in the clear water phase, characterized in that the basicity of the coagulant is regulated by adding in situ, to a stock solution of polymerized aluminum based coagulant (A), acid or a solution of an aluminum based coagulant (B) having a lower basicity than the polymerized aluminum based coagulant (A) in the stock solution, so as to in that way in situ obtain the aluminum based coagulant that is used in the precipitation process.

In a second embodiment the control system includes an algorithm with an adaptive function where stored control data at different contamination contents (i.e. degrees of contamination) and flows are used.

In a third embodiment meteorological data are used to counteract negative treatment effects caused by increased hydraulic load due to heavy precipitation and/or melting snow in the catchment area connected to the treatment plant.

In a further embodiment the difference between bound and free phosphorous in the outgoing chemically treated water is used for optimizing the aluminum dosing and basicity.

BRIEF DESCRIPTION OF THE FIGURE

FIG. 1 describes an embodiment of a device and method according to the invention.

DESCRIPTION OF THE PREFERRED EMBODIMENT

The description refers to FIG. 1. If possible, and according to the invention, existing equipment used for dosing PAC or PAS (1), i.e. the dosing that has earlier occurred directly to the water or waste water that is to be precipitated chemically, is used.

A stock solution (1) containing PAC or PAS is led to a reaction vessel (2). An acid, or alternatively a solution of monomeric aluminum salt or a solution (3) of PAS or PAC with a lower basicity than the stock solution (1) is added (3) to the reaction vessel. The proportions between solution (1) and (3) is regulated so that the mixture in the reaction vessel obtains the desired basicity. The mixing is done using an intensive stirrer (4) placed in the reaction vessel. Thereafter the now formed coagulant with the desired basicity is led to the treatment plant for finally being mixed with the water (5 & 6) that is to be purified by chemical precipitation. This is done, as is common, in an in-mixing tank (7) provided with an intensive stirrer (8). In this tank micro flocks are formed which in the following flocking tank(s) (9) develop into larger flocks. The flocking tank(s) are usually provided with slow-moving flocking stirrer (10).

With the current technology the user chooses the coagulant which according to experience gives the best purification result (and lowest operation costs) in relation to the coagulant dosing (g $Al/m^3$) over time. For this reason you select a coagulant which may either be monomeric or which may have a certain basicity. The coagulant dosing is adjusted, either manually or automatically, dependent on the purification result. In order to get a fast and simple indication of the purification result you can continuously measure color and/or turbidity in the water after flock separation. The purification result can also be measured by analyzing COD or TOC. These measurement results may also be supplemented by measurements on incoming water, which may give an early indication that the coagulant dosing may need adjusting. Consequently the coagulant dosing is the only parameter that you can vary to affect the purification result.

It is therefore an advantage to introduce a second variable parameter: the basicity of the coagulant. As presented earlier an increased basicity, at the same or lower coagulant dosing, generally gives a lower turbidity but worse reduction of dissolved organic substance. An advantage is further that basicity does not contribute to sludge production, which the coagulant does. An increased aluminum hydroxide content in the sludge further makes it more difficult to dewater, which contributes to an increased disposal cost.

The water temperature may affect the coagulant dosing, as may happen during treatment of raw water in tempered climate zones.

Controlling the precipitation process, so that the basicity increases with falling water temperatures, may then be an advantage even if the temperature change often is slow. The cost for handling (dewatering) and disposal of sludge has earlier not been a primary factor when calculating the operation cost, as this is primarily controlled by the necessity of adjusting the coagulant dosing according to set purification requirements.

The purification requirements for treated water, as well as the degree of contamination and type of contaminant in the untreated water, set different requirements on the chemical precipitation. These variations may be difficult to meet only by adjusting the coagulant dosing and may lead to an overdosing of coagulant or an inferior purification result.

Each individual water has specific flocking properties and the requirements on treated water are different.

The present invention differs from the Swedish patent 536998C2 in that the basicity in a solution of PAS or PAC with a basicity of A % is mixed with an acid or a monomeric aluminum sulfate/chloride, or a PAS or PAC with a lower basicity (B %) than the solution (A). If acid or a monomeric aluminum salt is used the basicity of the mixture (C %) may be regulated within the interval 0<C<A. If a PAS or PAC with a basicity of D % is used then the regulation can be done within the interval D<C<A.

The invention thus provides a method which on one hand requires a low investment and on the other hand simply can constitute a complement to those who for different reasons already have chosen or plan to use PAC. The investment in a complete plant becomes lower as the reaction rate is considerably faster than if hydroxide is used, which means that volume of tanks, pipes, etc. become smaller and cheaper. As only liquid products are used in the method according to the invention simple cheap storage tanks can replace expensive silo plants. The method further does not give rise the problems of lime deposits (scaling) in pipes and tank surfaces that the combination of lime/aluminum sulfate gives.

The optimization comprises the degree of contamination of the clear water phase after precipitation and sludge separation, operation costs and sludge production. The optimization thus has the purpose of obtaining the lowest possible operation cost and sludge production at a certain (remaining) degree of contamination in the clear water phase.

The term in situ is to be understood as on site in the treatment plant. This term thus does not encompass production and regulation of basicity, of aluminum based coagulants, that takes place at the producers of aluminum based coagulants.

The regulation of precipitation pH, amount of coagulant used in the precipitation process and the basicity of the coagulant, is made based on online measurements of at least degree of contamination, pH, flow and temperature of incoming untreated water and/or in the clear water phase.

The regulation of precipitation pH, amount of coagulant used in the precipitation process and the basicity of the coagulant may further be done based on one or more of the cost for the stock solution of the polymerized aluminum based coagulant (A), the disposal cost for sludge that is formed in the precipitation process, the content of bound and free phosphorous in the outgoing chemically precipitated water, and meteorological data comprising information regarding precipitation and/or snow melting in the catchment area that is connected to the treatment plant.

A control system for carrying out the method according to the invention may comprise:
  sensors configured for online measurement of at least the degree of contamination, pH, flow and temperature of incoming untreated water to the chemical precipitation process and/or in the clear water phase after the chemical precipitation process,
  first set of controllable pumps and/or controllable valves, configured for dosing the coagulant (A) (1) and the acid or the coagulant (B) (3) into the reaction vessel or tank (2),
  means, such as piping, bringing (5) the aluminum based coagulant from the reaction vessel (2) into contact with the water (6) that is to be treated by chemical precipitation in the water treatment plant or waste water treatment plant,
  pH regulation means, such as storage tanks containing acid and/or base and second set of controllable pumps and/or valves, configured for providing said acid and/or base to said in-mixing tank (7) and/or the flocking tank(s) (9) for regulating the precipitation pH, and
  a control computer configured for:
    regulating precipitation pH, amount of aluminum based coagulant (5) that is used in the chemical precipitation process and the basicity of the aluminum based coagulant, by controlling said first and second set controllable pumps and/or controllable valves, based on online measurements obtained from said sensors, so as to:
    optimize the chemical precipitation process, wherein the optimization comprises the degree of contamination of the clear water phase after precipitation and sludge separation, cost of operation and sludge production.

The aluminum based coagulant (B) may be monomeric (basicity=0%) or polymerized (basicity >0%)

The aluminum based coagulant that is used in the precipitation process is preferably used as soon as it has been formed from the stock solution, but it can also be stored for later use.

Preferably the polymerized aluminum based coagulant (A) has a basicity >20%. If the stock solution contains a poly aluminum salt where the basicity may be as high as 80% the basicity may be regulated from 0 to 80% which is an interval that is larger than if hydroxide is added to a monomeric coagulant where the upper limit that can be reached is maximum about 55%.

The response time between a change in degree of contamination degree of the incoming water to the chemical step (the precipitation process) and its effect on the outgoing chemically purified water varies with the water flow.

To compensate for this, according to the invention, the algorithm controlling the regulation is adaptive, and regulation of Al-dosing (the amount of aluminum based coagulant that is used) and its basicity, in the event of a changed contamination degree in incoming water and flow, is therefore done initially based on stored data. These data consist of the optimization (first optimization) that has earlier been done at similar or the same degree of contamination in incoming and outgoing chemically precipitated water and the then current flow. Taking into account the response time (which may be calculated based on the residence time in the chemical precipitation process at the current flow) a final adjustment (second optimization) of the basicity and Al-dosing then takes place now based on the degree of contamination which has been obtained in the outgoing treated water after the response time.

Use of an early warning system which predicts that the purification result may be affected by an increased hydraulic load entails that you can use meteorological data which indicates heavy precipitation and/or snow melting in the catchment area that is connected to the treatment plant.

Accordingly the method in a third embodiment may use meteorological data to prevent negative treatment effect of increased hydraulic load in the chemical step caused by heavy precipitation and/or snow melting in the catchment area that is connected to the treatment plant.

Chemical precipitation is in many cases a necessary step in the treatment process for limiting the discharge of phosphorous when treating industrial and municipal waste waters.

You then utilize the ability of trivalent iron or aluminum ions to bind phosphorous in a poorly soluble phosphate compound. If the dissolved phosphate content in incoming water is analyzed you can control the dosing of metal ions in proportion to the analyzed phosphate amount. The basicity of the coagulant is hereby without meaning as it does not affect the chemical binding. Phosphorous may, despite an optimal dosing of coagulant, be discharged from the chemical precipitation step bound in particles. The following is an illustrative example: A heavy rainfall causes an increased flow in a municipal treatment plant. During a first period when the mains are flushed clean the phosphorous content and the amount of particles suspended in the water increase at the same time as the hydraulic load increases. To chemically bind an increased content of dissolved phosphorous the coagulant dosing should be increased, while an increased amount of suspended substances in combination with increased hydraulic load at the same time entails that the basicity should also be increased. Once the mains have been flushed clean the phosphorous content and the amount of suspended substances decrease while the hydraulic load remains or increases.

The lower phosphorous content entails that the aluminum dosage should be decreased while the basicity should remain at a high level to counteract the inferior flock separation that an increased hydraulic load often gives. This highlights the importance of analyzing both dissolved and bound phosphorous and controlling both AL dosing as well as basicity based on these measurements.

Accordingly the control system, in a fourth embodiment, in the optimization of the Al dosing, i.e. the amount of aluminum based coagulant, and its basicity, also takes into account how large the difference is in the content of bound and free phosphorous in outgoing chemically precipitated water.

Here the content of dissolved phosphorous substantially controls the regulation of the amount of coagulant that is used in the precipitation process while the content of bound P (phosphorous) substantially controls the regulation of the basicity of the coagulant.

In further embodiments the acid is HCl or $H_2SO_4$.

In these embodiments the acid may be HCl if the polymerized aluminum based coagulant (A) is polymerized aluminum chloride, and the acid may be $H_2SO_4$ if the polymerized aluminum based coagulant (A) is polymerized aluminum sulfate.

In certain embodiments the aluminum based coagulant (B) has a basicity, expressed in %, which is larger than 0% and lower than the basicity of the polymerized aluminum based coagulant (A).

In other embodiments the aluminum based coagulant (B) is a monomeric aluminum based coagulant and has the basicity 0%.

The invention claimed is:

1. A method of optimizing the chemical precipitations process in water treatment plants and waste water treatment plants using an aluminum based coagulant, wherein the optimization, which comprises the degree of contamination of the clear water phase after precipitation and sludge separation, cost of operation and sludge production, is obtained by in situ regulation, of precipitation pH, amount of coagulant that is used in the precipitation process and the basicity of the coagulant, based at least on online measurement of degree of contamination, pH, flow and temperature of incoming untreated water and/or in the clear water phase,
   wherein the basicity of the coagulant is regulated by adding in situ, to a stock solution of a polymerized aluminum based coagulant (A), acid or a solution of a polymerized aluminum based coagulant (B) having a lower basicity than the polymerized aluminum based coagulant (A) in the stock solution, so as to in that way in situ obtain the aluminum based coagulant that is used in the precipitation process,
   wherein the acid or solution of polymerized aluminum based coagulant (B) is mixed with the stock solution of the polymerized aluminum based coagulant (A) in a reaction vessel provided with a stirrer before the obtained aluminum based coagulant is mixed with the water to be treated by the chemical precipitation.

2. The method according to claim 1, wherein the amount of coagulant that is used in the precipitation process and the basicity of the coagulant is regulated by an algorithm which includes an adaptive function in which stored regulation data at different degrees of contamination and flows is used to make a first optimization of the amount of coagulant to be used in the precipitation process and the basicity of the coagulant, based on flow, temperature and degree of contamination in incoming water, and in that the first optimization is followed by a second optimization based on the obtained degree of contamination in outgoing chemically precipitated water, wherein the latter optimization is performed first when the purification effect of the first optimization can be expected to be detectable.

3. The method according to claim 2, wherein the purification effect of the first optimization is calculated based on the residence time in the chemical precipitation process at the current flow.

4. The method according to claim 1, wherein a control system for regulation of precipitation pH, the amount of coagulant used in the precipitation process and the basicity of the coagulant, in addition to degree of contamination, pH, flow and temperature of the incoming untreated water and/or in the clear water phase, further uses meteorological data comprising information regarding precipitation and/or snow melting in the catchment area connected to the treatment plant.

5. The method according to claim 1, wherein both the content of dissolved and bound phosphorous (P) is analyzed in the outgoing chemically precipitated water, and in that the content of dissolved phosphorous controls the regulation of the amount of coagulant that is used in the precipitation process, while the content of bound phosphorous controls the regulation of the basicity of the coagulant.

6. The method according to claim 1, wherein the acid is HCl or $H_2SO_4$.

7. The method according to claim 1, wherein the acid is HCl if the polymerized aluminum based coagulant (A) is polymerized aluminum chloride, and wherein the acid is $H_2SO_4$ if the polymerized aluminum based coagulant (A) is polymerized aluminum sulfate.

8. The method according to claim 1, wherein the polymerized aluminum based coagulant (B) has a basicity, expressed in %, which is larger than 0% and lower than the basicity of the polymerized aluminum based coagulant (A).

9. The method according to claim 1 wherein the polymerized aluminum based coagulant (B) is a monomeric aluminum based coagulant and has the basicity 0%.

10. The method according to claim 1, wherein the polymerized aluminum based coagulant (A) has a basicity >20%.

11. The method according to claim 1, wherein the stock solution of the polymerized aluminum based coagulant (A) is held in the reaction vessel provided with the stirrer for mixing the acid or the solution of the polymerized aluminum based coagulant (B) with the stock solution of the polymerized aluminum based coagulant (A).

* * * * *